US008830583B2

(12) United States Patent   (10) Patent No.: US 8,830,583 B2
Suzuka   (45) Date of Patent: Sep. 9, 2014

(54) POSITION CONTROLLER FOR REMOVABLE OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 50 days.

(21) Appl. No.: 13/372,938

(22) Filed: Feb. 14, 2012

(65) Prior Publication Data

US 2012/0218635 A1   Aug. 30, 2012

(30) Foreign Application Priority Data

Feb. 28, 2011 (JP) ................................. 2011-042027
Jul. 25, 2011 (JP) ................................. 2011-162406

(51) Int. Cl.
| | |
|---|---|
| G02B 27/64 | (2006.01) |
| G02B 7/14 | (2006.01) |
| G03B 5/00 | (2006.01) |
| H04N 5/225 | (2006.01) |

(52) U.S. Cl.
CPC ................ *G02B 27/646* (2013.01); *G02B 7/14* (2013.01); *G03B 5/00* (2013.01); *H04N 5/2254* (2013.01); *G03B 2205/0015* (2013.01); *G03B 2205/0069* (2013.01); *G03B 2217/005* (2013.01); *G03B 2205/0092* (2013.01)
USPC ............................................ 359/554; 396/55

(58) Field of Classification Search
USPC ................. 359/554, 557, 819, 824, 827, 830; 396/55, 349, 529, 534
See application file for complete search history.

(56) References Cited

U.S. PATENT DOCUMENTS

| | | | |
|---|---|---|---|
| 6,978,089 B2 | 12/2005 | Nomura et al. | |
| 7,050,713 B2 | 5/2006 | Nomura | |
| 7,742,246 B2 * | 6/2010 | Miyamoto | ..................... 359/819 |
| 8,090,249 B2 | 1/2012 | Suzuka | |
| 8,121,467 B2 | 2/2012 | Suzuka | |
| 8,275,249 B2 * | 9/2012 | Imura et al. | ..................... 396/55 |

FOREIGN PATENT DOCUMENTS

| | | | |
|---|---|---|---|
| JP | 2003-315861 | | 11/2003 |
| JP | 2004-233922 | | 8/2004 |
| JP | 2006-017063 | * | 1/2006 |
| JP | 2006-58455 | | 3/2006 |
| JP | 2007-163961 | | 6/2007 |
| JP | 2008-170650 | | 7/2008 |

OTHER PUBLICATIONS

U.S. Appl. No. 13/352,564 to Shinya Suzuka, filed Jan. 18, 2012.
U.S. Appl. No. 13/372,955 to Shinya Suzuka, filed Feb. 14, 2012.
U.S. Appl. No. 13/372,969 to Shinya Suzuka, filed Feb. 14, 2012.
U.S. Appl. No. 13/372,987 to Shinya Suzuka, filed Feb. 14, 2012.
U.S. Appl. No. 13/402,065 to Shinya Suzuka, filed Feb. 22, 2012.
U.S. Appl. No. 13/402,072 to Shinya Suzuka, filed Feb. 22, 2012.

* cited by examiner

*Primary Examiner* — William Choi
*Assistant Examiner* — Sharrief Broome
(74) *Attorney, Agent, or Firm* — Greenblum & Bernstein, P.L.C.

(57) ABSTRACT

A position controller for a removable optical element in an optical system includes an advancing/retracting ring; a removable optical element holding member supported by the advancing/retracting ring and rotatable about a first rotational axis between an insertion position on the optical axis and a removed position; an insertion holder which holds the removable optical element holding member at the insertion position; a removal drive member supported by the advancing/retracting ring and rotatable about a second rotational axis between an insertion allowance position and a forced removing position; and an insertion/removal controller. A rotational radius from the second rotational axis to a contact point between the removable optical element holding member and the removal drive member is greater than a rotational radius from the first rotational axis to the contact point.

9 Claims, 15 Drawing Sheets

POSITION CONTROLLER FOR REMOVABLE OPTICAL ELEMENT

BACKGROUND OF THE INVENTION

1. Field of the Invention

The present invention relates to a position controller for a removable optical element which is moved onto and removed from a photographing optical axis in accordance with switching between a ready-to-photograph state and an accommodated state.

2. Description of the Related Art

A configuration in which a removable optical element, provided as part of a photographing optical system, which is movable in a plane orthogonal to an optical axis of the photographing optical system and is moved from a position on the photographing optical axis to a removed position radially away from the optical axis of the photographing optical system is known in the art as a lens-barrel (photographing lens) miniaturization technique, specifically as a technique that contributes to the reduction in thickness of a retractable lens barrel in an optical axis direction in a lens barrel accommodated state (fully retracted state) in which no pictures are taken.

In a retractable photographing lens disclosed in Japanese Unexamined Patent Publication No. 2003-315861 is provided, in a removable lens group support frame (20) movable in the optical axis direction of the photographing lens, with a removable lens frame (21) which holds a removable lens group and is rotatable (swingable) about a rotational shaft parallel to the photographing optical axis. When the photographing lens moves from a ready-to-photograph state to the lens barrel accommodated state, a rearward movement of the removable lens group support frame (20) in the optical axis direction firstly causes the position-control cam bar (11a) of the CCD frame (11) to come into contact with the position-control projection (21f) of the removable lens frame (21), and subsequently causes the position-control cam bar (11a) to press and rotate the removable lens frame (21) in a direction away from the photographing optical axis.

A retractable photographing lens disclosed in Japanese Unexamined Patent Publication No. 2008-170650 is configured to allow a positional adjustment of a third lens group (23) with respect to a shutter frame (9) in an optical axis direction when the third lens group (23) that serves as a retractable optical element is driven to retract from a photographing optical path. This photographing lens is provided with a rotational drive member (35) which is fitted on the pivotally-supporting boss (10a) of the third lens group frame (10) to be movable in the optical axis direction relative to the pivotally-supporting boss (10a) and to rotate with the pivotally-support boss (10a), and the rotational drive member (35) is pressed by an end-face cam (14) to rotate the third lens group frame (10) about the support shaft (52) via a rotational drive member (35) when the third lens group frame (10) is driven to retract to the retracted position.

A retractable photographing lens disclosed in Japanese Unexamined Patent Publication No. 2007-163961 is configured to allow the third lens group (L3), which is provided as a retractable optical element, to additionally perform an anti-shake operation (image shake correcting operation/image stabilizing operation). In this photographing lens, an oscillating member (17) is supported to be movable in a plane orthogonal to an optical axis relative to a fixed member (16) provided in the third lens group barrel (15), and an image-stabilizing optical system holding member (19) is rotatably supported by the oscillating member (17) thereon. In a ready-to-photograph state, an image-stabilizing operation is performed to correct image shake by driving the oscillating member (17) using a voice coil motor (18). When the photographing lens moves to the lens barrel accommodated state, a movement of the third lens group barrel (15) in the optical axis direction causes a driving member (4a) of a CCD mount (4) to come into contact with a contact portion (19b) of the image-stabilizing optical system holding portion (19) so as to press and rotate the image-stabilizing optical system holding portion (19) in a direction radially away from the optical axis from a position thereon.

It is desirable for the removable optical element removing operation to be performed efficiently with high precision with a structure which is as compact as possible. In a photographing lens like the photographing lenses disclosed in Japanese Unexamined Patent Publication Nos. 2003-315861, 2008-170650 and 2007-163961, in which the removable optical element removing operation is performed by translating a linear moving force of a moving member (which is adopted to perform the retracting operation of a photographing optical system) in an optical axis direction into a rotational force by a cam mechanism, the drive efficiency of the retracting operation (the amount of removal movement of the removable optical element per unit of linear movement of the moving member) can be set by the determining the profile of a cam surface of the cam mechanism.

However, in the structure like that disclosed in Japanese Unexamined Patent Publication No. 2007-163961 in which a removable optical element holding member (the image-stabilizing optical element holding member 19) is driven in a plane orthogonal to an optical axis for a purpose (i.e., image stabilization) irrelevant to the removable optical element removing operation, an anti-shake operation (vibration isolating operation/image stabilizing operation) causes the point of contact of the removable optical element holding member with a cam (the driving portion 4a) made for the removal driving to vary, which may deteriorate the accuracy of the removable optical element removing operation. To prevent this problem from occurring, countermeasures are required such as performing the lens barrel retracting operation after holding the holding member for the removable optical element at a predetermined position in a plane orthogonal to the optical axis. However, such a countermeasure tends to increase the size of the removal drive mechanism for the removable optical element, complicates the structure thereof and requires much time and trouble to adjust to the removal drive mechanism. In addition, even in the case where the removable optical element holding member is moved for any other purpose than image shake correction (shake reduction/image stabilization), if an adjustment is made to the position of the removable optical element in the optical axis direction (e.g., the position of the axis of the rotational member which holds the removable optical element) during the manufacturing stage or when a similar adjustment is carried out, the relative position between the holding member for the removable optical element and the cam mechanism varies, which requires a similar countermeasure. Additionally, in the case where the removable optical element is held on a holding member which can move in a plane orthogonal to the optical axis or the position of which is adjustable in this orthogonal plane, it is difficult to construct a compact removal drive mechanism for the removal optical element while preventing this mechanism from interfering with the aforementioned holding member.

SUMMARY OF THE INVENTION

The present invention has been devised in view of the above-mentioned drawbacks and provides a position controller for a removal optical element which is moved onto and removed from a photographing optical axis in accordance with switching between a ready-to-photograph state and an accommodated state, wherein the position controller is capable of allowing the removable optical element removing operation to be performed efficiently and with high precision while maintaining a compact structure.

According to an aspect of the present invention, a position controller for a removable optical element is provided in a photographing optical system which moves between a ready-to-photograph state and an accommodated state in which no pictures are taken, including an advancing/retracting ring movable in an optical axis direction of the photographing optical system, wherein the advancing/retracting ring is moved between a first position at which the photographing optical system is in the ready-to-photograph state and a second position at which the photographing optical system is in the lens barrel accommodated state; a removable optical element holding member which holds the removable optical element and is supported by the advancing/retracting ring therein to be rotatable about a first rotational axis, which is parallel to the optical axis, between an insertion position at which the removable optical element is positioned on the optical axis and a removed position at which the removable optical element is removed from a position on the optical axis; an insertion holder which holds the removable optical element holding member at the insertion position when the photographing optical system is in the ready-to-photograph state; a removal drive member which is supported by the advancing/retracting ring to be rotatable about a second rotational axis that is substantially parallel to the optical axis between an insertion allowance position at which the removal drive member is in noncontact with the removable optical element holding member at the insertion position and a forced removing position at which the removal drive member comes in contact with and presses the removable optical element holding member to rotate the removable optical element holding member from the insertion position to the removed position; and an insertion/removal controller which holds the removal drive member in the insertion allowance position when the photographing optical system is in the ready-to-photograph state, and rotates the removal drive member from the insertion allowance position to the forced removing position when the advancing/retracting ring moves in the optical axis direction from the first position to the said position. A rotational radius from the second rotational axis of the removal drive member to a contact point between the removable optical element holding member and the removal drive member is greater than a rotational radius from the first rotational axis of the removable optical element holding member to the contact point.

It is desirable for a distance from the optical axis to the second rotational axis to be greater than a distance from the optical axis to the first rotational axis.

It is desirable the insertion/removal controller to include a biasing member which biases the removal drive member to rotate toward the insertion allowance position; and a pressing member which is spaced away from the removal drive member in the optical axis direction when the photographing optical system is in the ready-to-photograph state, and the pressing member comes into contact with and presses the removal drive member to rotate the removal drive member toward the forced removing position against a biasing force of the biasing member when the advancing/retracting ring moves from the first position to the second position.

It is desirable for the position controller to include a positional adjustment mechanism which enables a positional adjustment to be carried out on the removable optical element holding member along a plane orthogonal to the optical axis relative to the advancing/retracting ring independently of rotation of the removable optical element holding member between the insertion position and the removed position.

It is desirable for the positional adjustment mechanism to include an anti-shake moving member supported by the advancing/retracting ring to be movable along a plane orthogonal to the optical axis; and an anti-shake driver which drives the anti-shake moving member in accordance with vibrations applied to the photographing optical system to reduce image shake of an image focused on an image plane, wherein the removable optical element holding member is pivotally supported on the anti-shake moving member.

It is desirable for a clearance to be formed between the removable optical element holding member and the removal drive member to prevent interference between the removable optical element holding member and the removal drive member which may be caused by a variation in position of the removable optical element holding member when the photographing optical system is in the ready-to-photograph state, the variation being caused by the positional adjustment mechanism.

It is desirable for the biasing member to include a torsion coil spring, a coiled portion of which is positioned around the second rotational axis.

It is desirable for the insertion holder to include a spring and a stopper formed on the anti-shake moving member.

It is desirable for the anti-shake drive mechanism to include an electromagnetic actuator.

It should be noted that neither of the first position and the second position of the advancing/retracting ring is limited to a single specified position with respect to the optical axis direction, and each includes the case where the optical axis position thereof changes at the ready-to-photograph state or at the accommodated state. For example, in the case where the present invention is applied to a zoom lens system which performs zooming by moving the advancing/retracting ring in the optical axis direction, the first position can refer to any position within the moving range along the optical axis direction during zooming in the ready-to-photograph state. Similarly, the second position can refer to any position of the advancing/retracting ring within a predetermined range along in the optical axis direction in the accommodated state.

According to the present invention, since the removable optical element holding member is made to rotate to the removed position via the removal drive member, which is a rotational member supported by the advancing/retracting member separately from the removable optical element holding member, a high-precision and reliable removable optical element removing operation can be performed by translating a moving force of the advancing/retracting member into a rotational operation of the removal drive member. In addition, since the positions of the rotational axes of the removable optical element holding member and the removal drive member are determined so that the rotational radius of the removal drive member to the contact point between the removable optical element holding member and the removal drive member becomes greater than the rotational radius of the removable optical element holding member to the contact point, the amount of rotation of the removable optical element holding member in proportion to the amount of rotation of the removal drive member can be increased, so that the position controller can make the removable optical element removing operation perform efficiently and with high precision while maintaining a compact structure.

The present disclosure relates to subject matter contained in Japanese Patent Applications Nos. 2011-42027 (filed on Feb. 28, 2011) and 2011-162406 (filed on Jul. 25, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
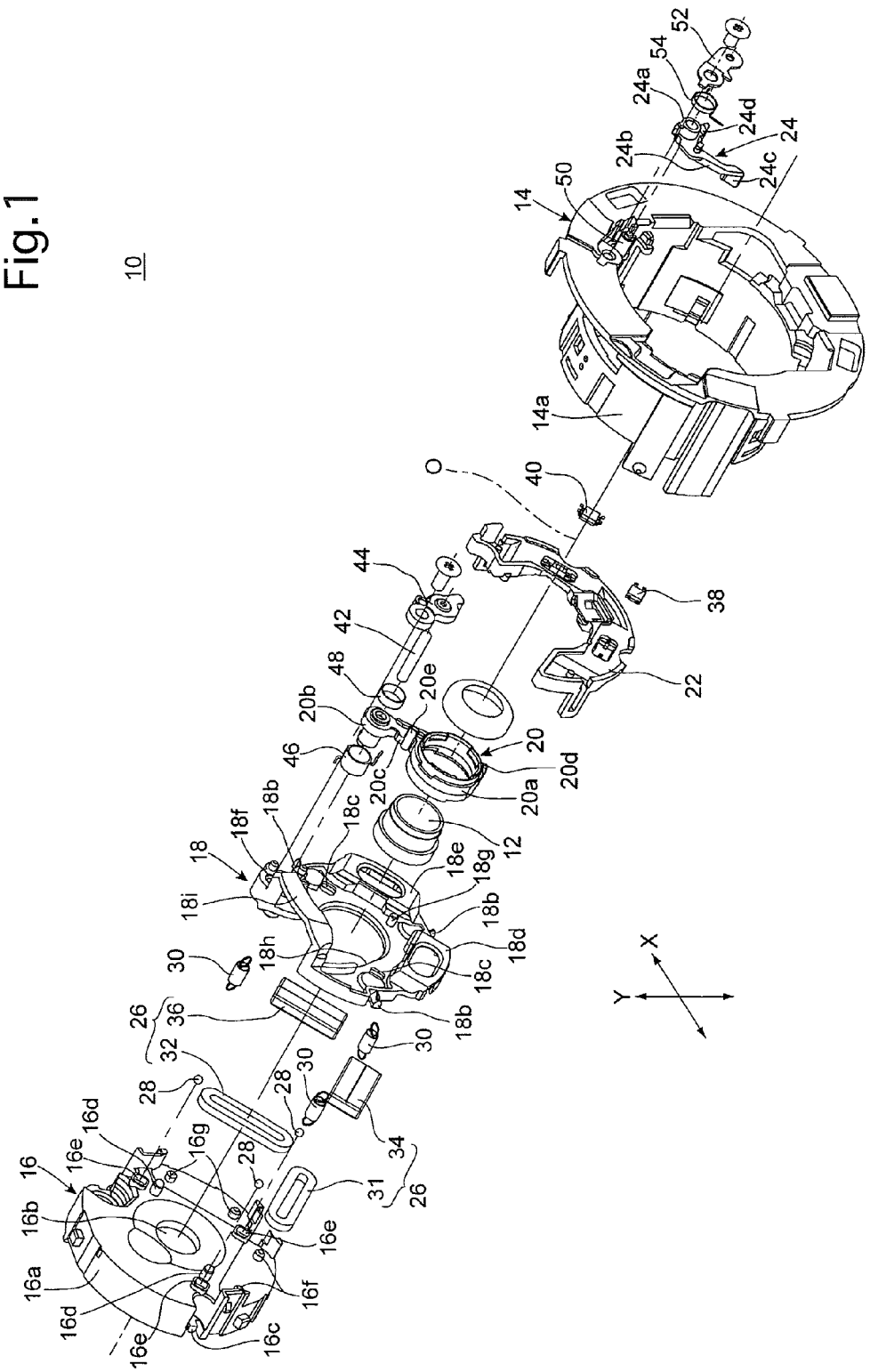
FIG. 1 is a rear exploded perspective view of an embodiment of an anti-shake lens unit according to the present invention that is designed for a lens shutter camera having a retractable photographic lens.
Figure 2:
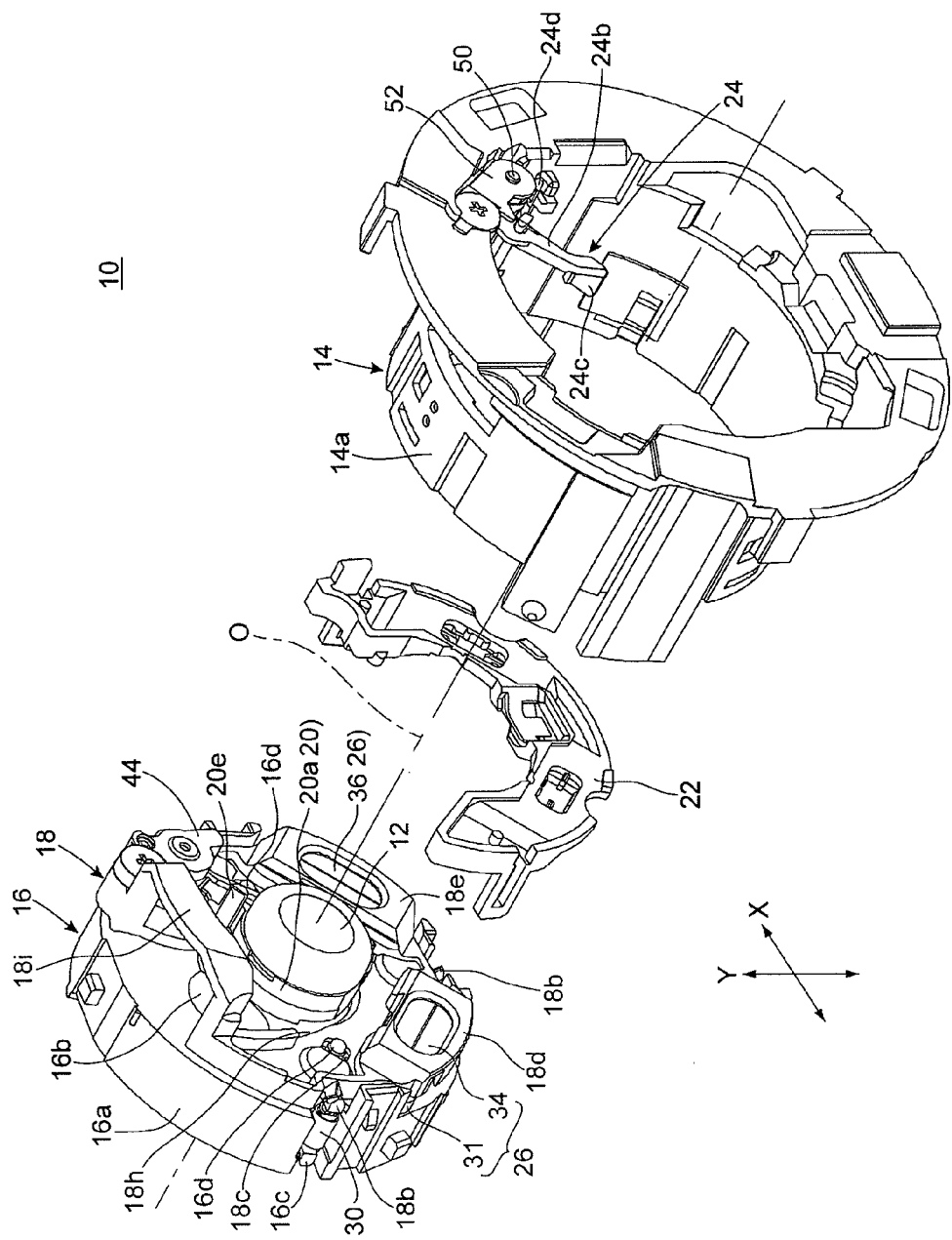
FIG. 2 is an exploded rear perspective view of the anti-shake lens unit with a sensor holder and a linear moving ring dismounted.
Figure 3:
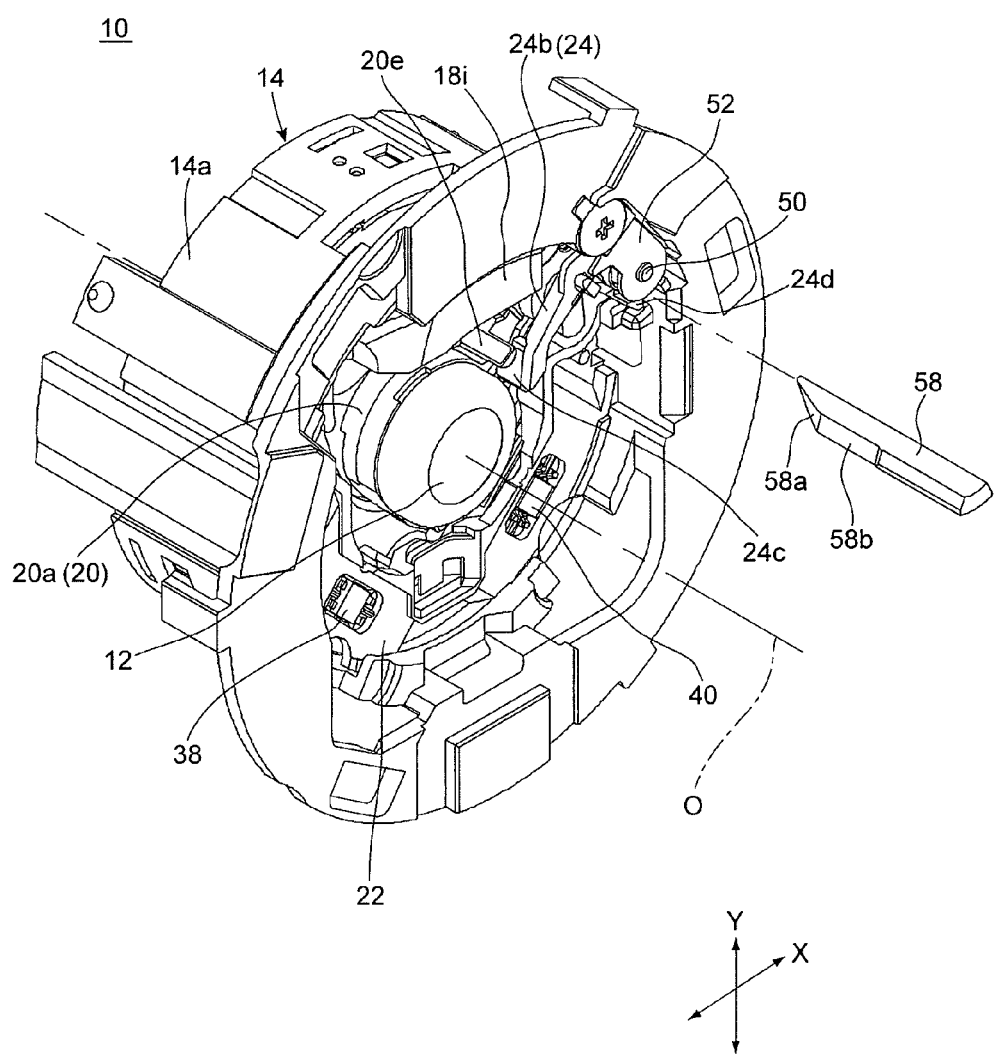
FIG. 3 is a rear perspective view of the anti-shake lens unit and an insertion/removal control-projection in the middle of the lens barrel retracting operation of the lens barrel.
Figure 4:
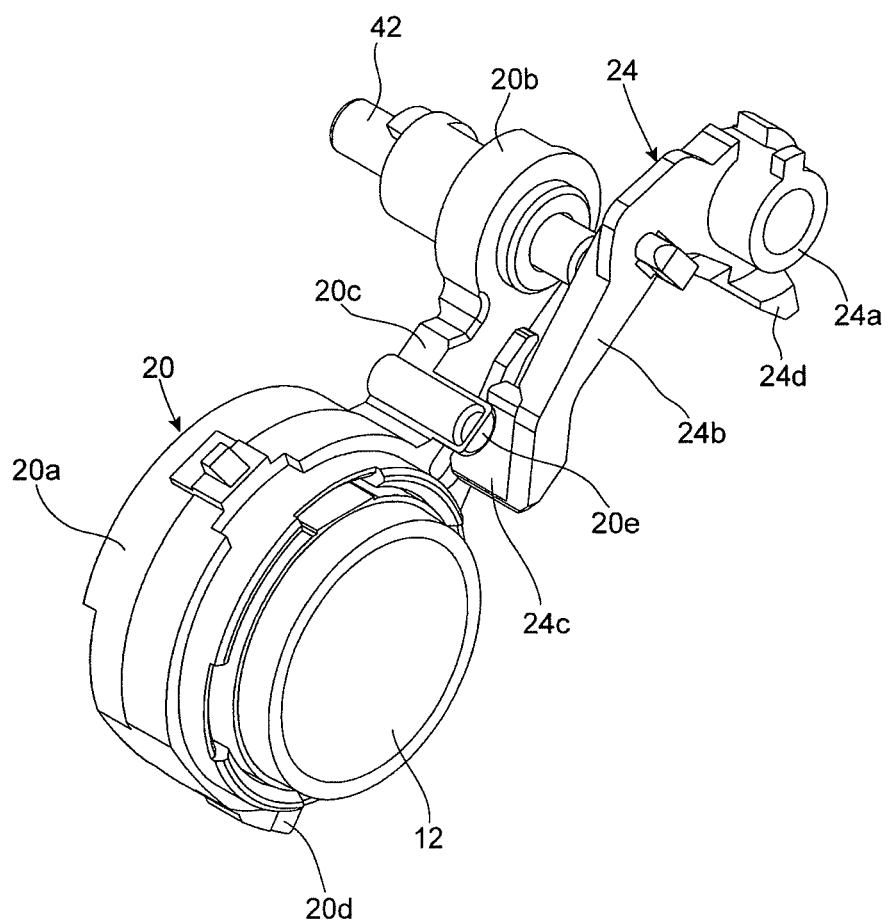
FIG. 4 is a rear perspective view of an insertable/removable frame and a removal drive lever, showing the positional relationship therebetween in a ready-to-photograph state of the lens barrel.
Figure 5:
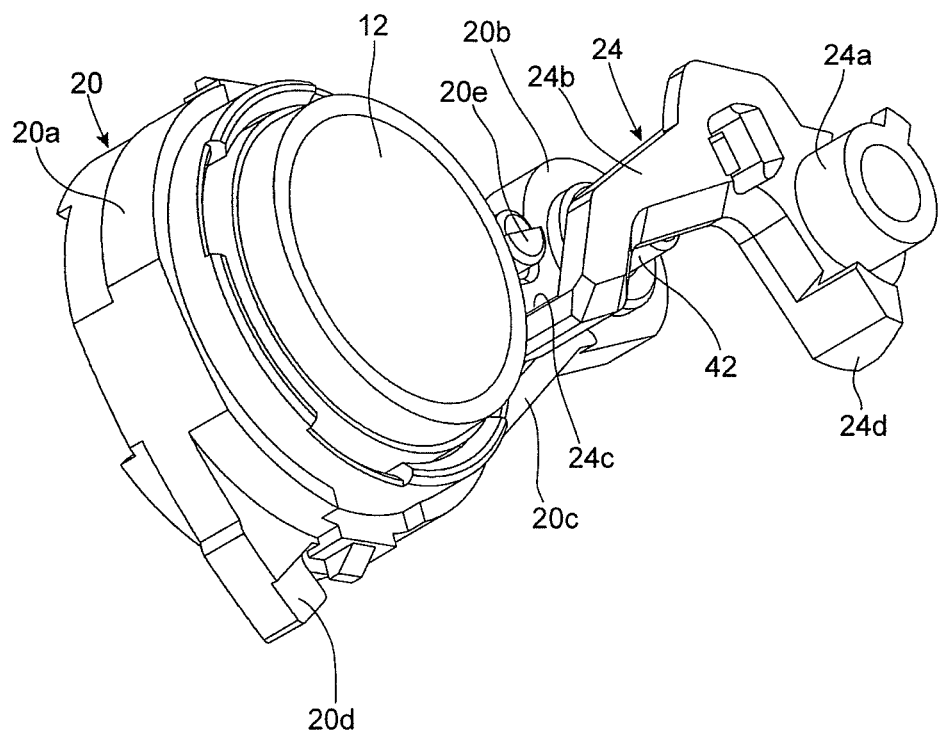
FIG. 5 is a rear perspective view of the insertable/removable frame and the removal drive lever in the ready-to-photograph state of the lens barrel, viewed from a different angle.

An anti-shake lens unit 10 shown in FIGS. 1 through 3 constitutes a part of a lens barrel (photographing lens) incorporated in a camera, and supports therein an insertable/removable image-stabilizing lens (removal optical element) 12 which constitutes a part of a photographing optical system of the lens barrel. As shown in FIG. 1, the anti-shake lens unit 10 is provided with a linear moving ring (advancing/retracting ring) 14, and is provided in the linear moving ring 14 with a shutter unit (advancing/retracting ring) 16, an anti-shake frame (an element of a positional adjustment mechanism/anti-shake moving member) 18, an insertable/removable frame (removable optical element holding member) 20, a sensor holder 22, a removal drive lever (removal drive member) 24, and an anti-shake drive actuator (an element of the positional adjustment mechanism/anti-shake driver) 26.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane (second position) from the object side (first position) by the driving force of a lens barrel drive motor 61 (see FIG. 15) when the lens barrel is brought into a lens barrel accommodated state (fully retracted state) from a ready-to-photograph state. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at there different circumferential positions on the outer periphery of the shutter housing 16a, with three spring hook projections 16c (only one of which is shown in FIGS. 1 and 2), respectively, and is provided on a rear surface thereof with two movement limit projections 16d and three ball support holes 16e. The ball support holes 16e are bottomed holes which are open toward the rear (see FIG. 13).

Figure 13:
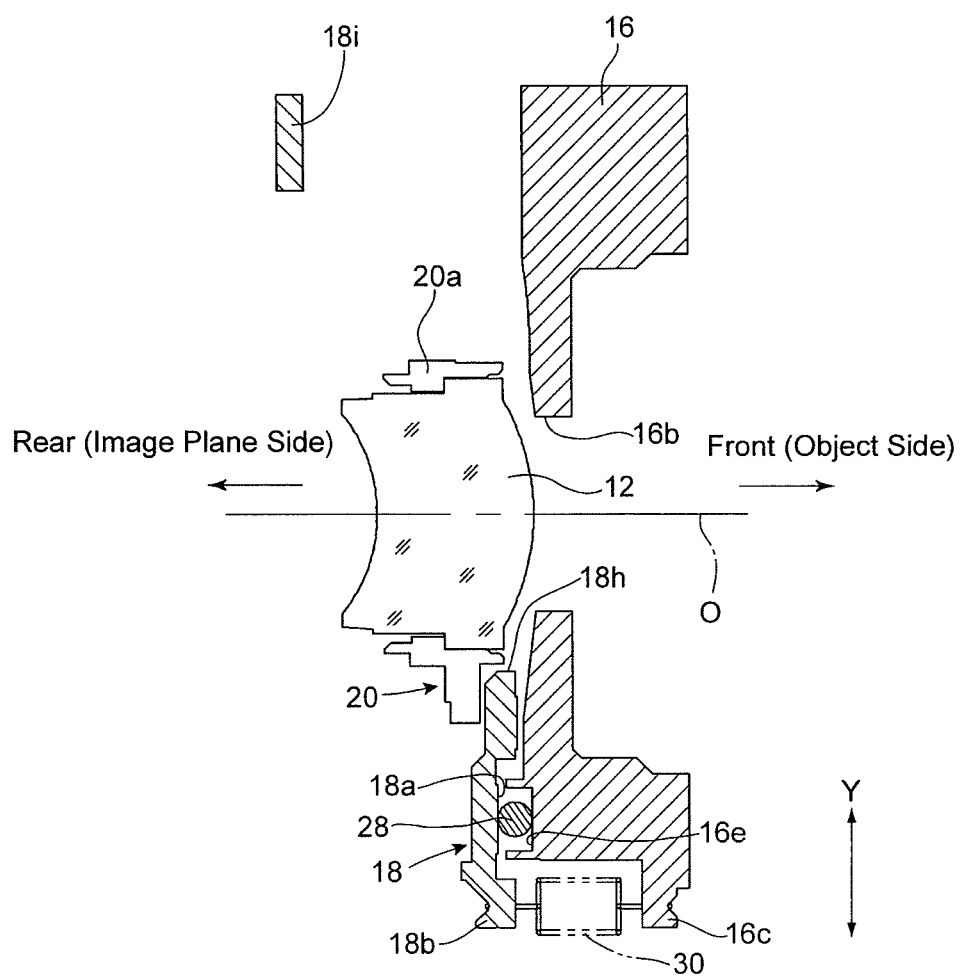
FIG. 13 is a sectional view taken along the line Z1-Z1 shown in FIG. 12.

The anti-shake frame 18 is supported at the rear of the shutter unit 16. As shown in FIG. 13, three ball contact surfaces 18a are formed on the front of the anti-shake frame 18 that faces the shutter unit 16, and three guide balls 28 are held between the three ball contact surfaces 18a and the bottoms of the three ball support holes 16e, respectively. As mentioned above, the shutter unit 16 is provided with the three ball support holes 16e, and the three ball contact surfaces 18a and the three guide balls 28 are provided to correspond to the three ball support holes 16e. The three ball contact surfaces 18a are flat surfaces which lie in a plane substantially orthogonal to the photographing optical axis O. The three guide balls 28 are loosely fitted in the three ball support holes 16e, respectively, so that there is a clearance between each guide ball 28 and the inner wall of the associated ball support hole 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at three different circumferential positions on the outer periphery thereof, with three spring hook projections 18b, respectively, and three extension springs 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame 18 can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the anti-shake drive actuator 26. The anti-shake drive actuator 26 is an electromagnetic actuator which is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively. In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
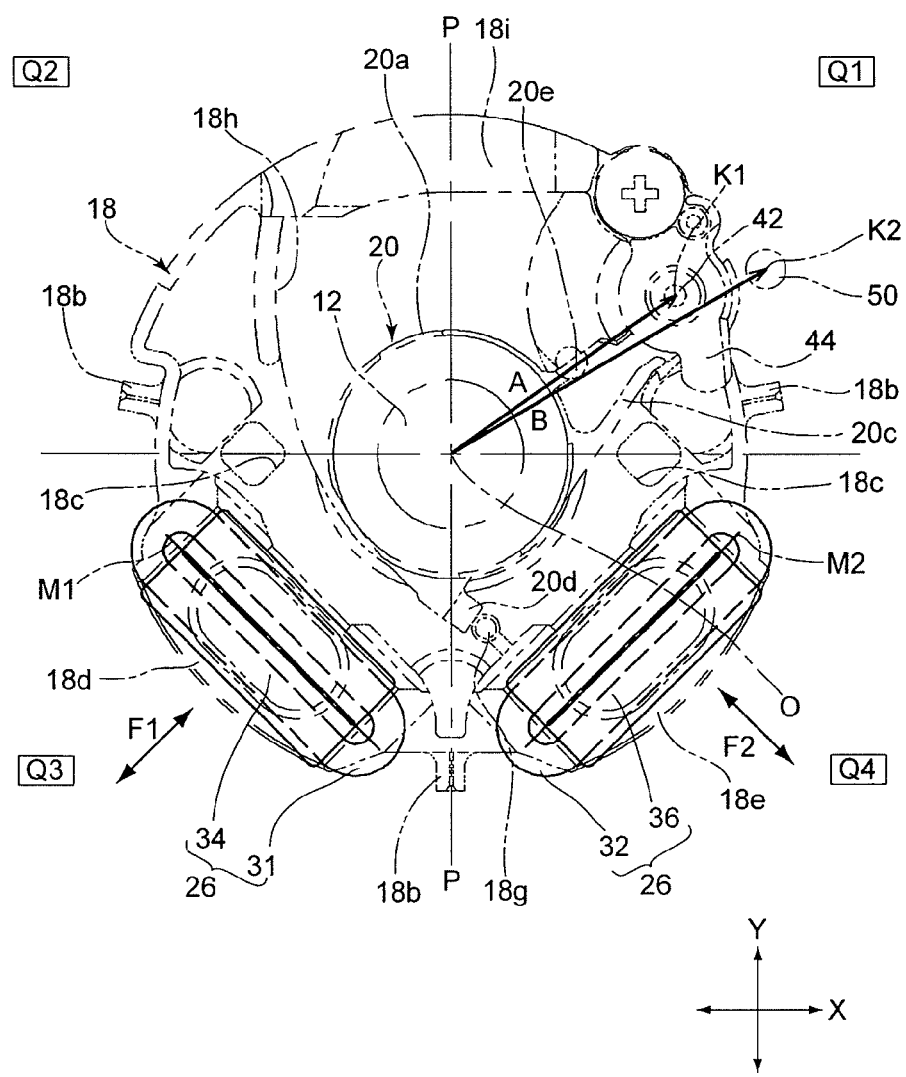
FIG. 8 is a diagram of the elements of an anti-shake drive actuator shown in FIG. 7 shown in a manner to emphasize these elements.
Figure 11:
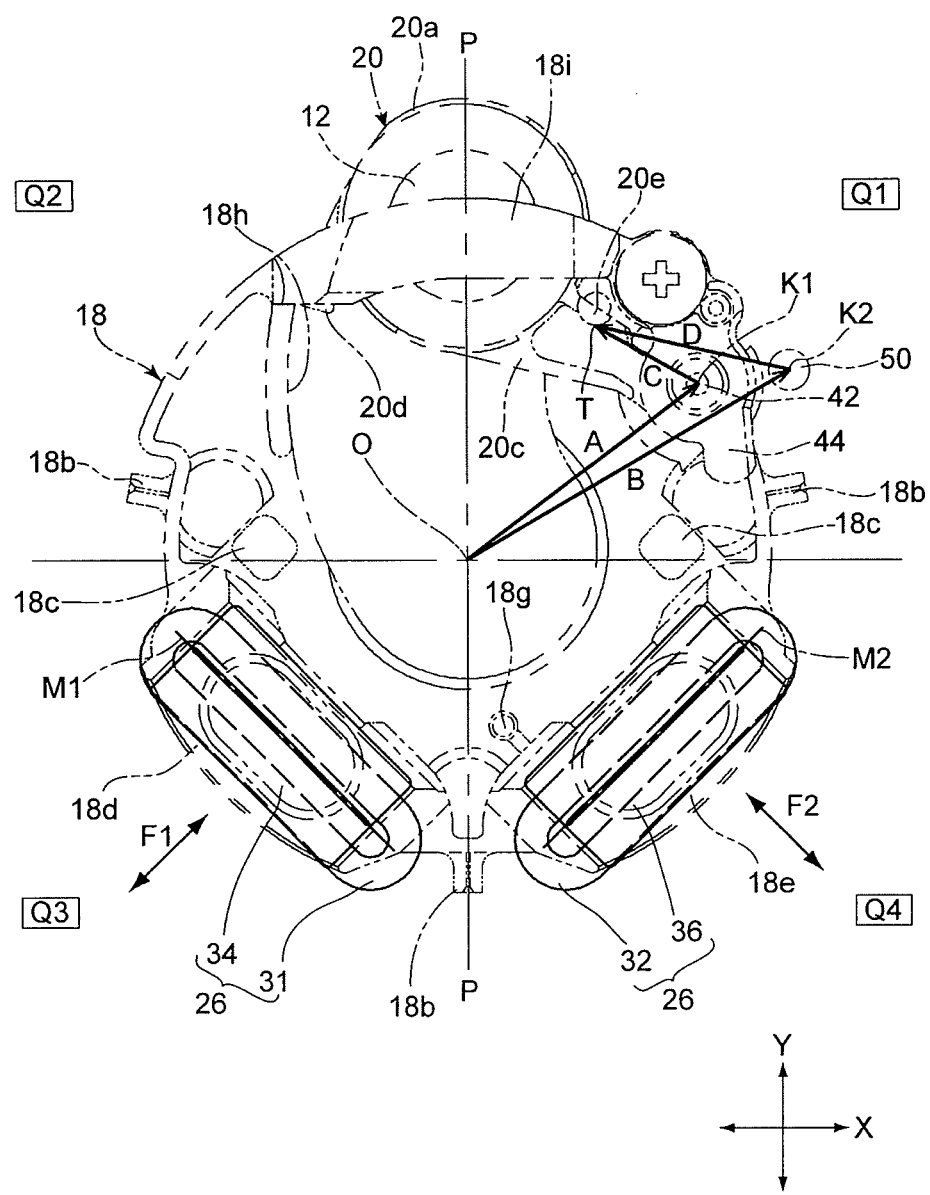
FIG. 11 is a diagram of the elements of the anti-shake drive actuator shown in FIG. 10 shown in a manner to emphasize these elements.
Figure 12:
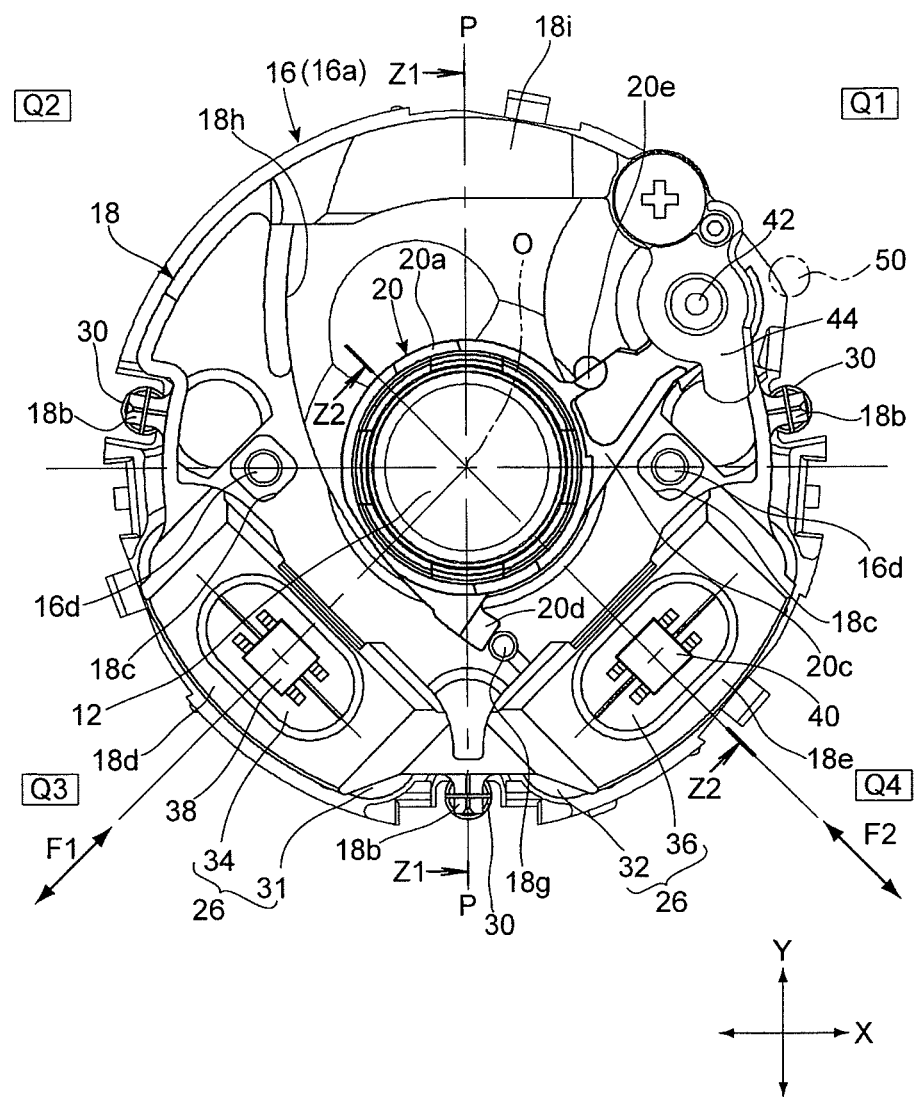
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16f and a pair of positioning projections 16g (see FIG. 1). The coil 31 is supported on the shutter unit 16 with the pair of positioning projections 16f engaged into the air-core portion of the coil 31, and the coil 32 is supported on the shutter unit 16 with the pair of positioning projections 16g engaged in the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board (not shown)) which extends from the shutter unit 16, and are further connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit 60 (see FIG. 15) on the above-mentioned control circuit board.

Figure 14:
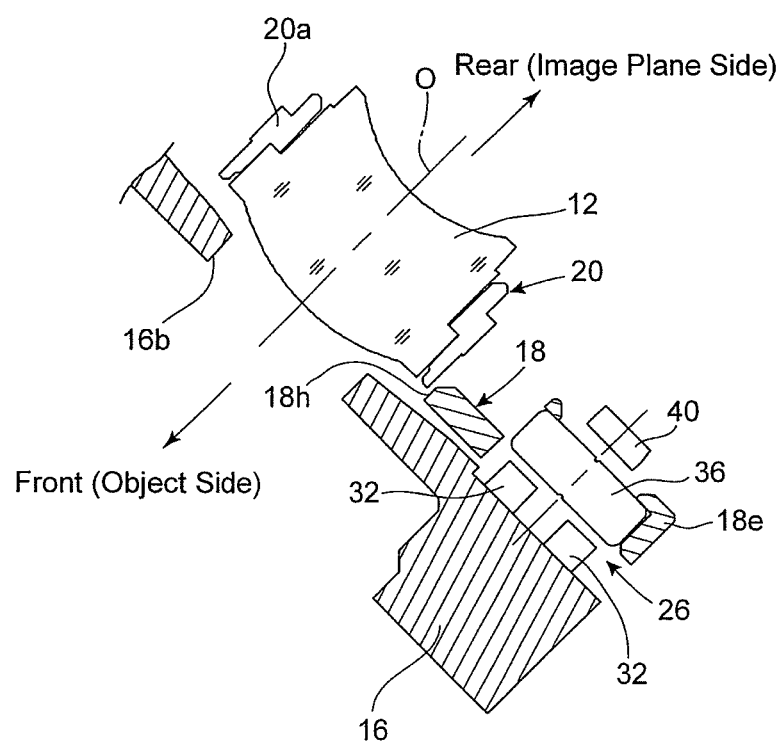
FIG. 14 is a sectional view taken along the line Z2-Z2 shown in FIG. 12.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 16d, respectively.

The sensor holder 22 is fixed to the shutter unit 16 that is positioned inside the linear moving ring 14. The sensor holder 22 is positioned behind the anti-shake frame 18, has a shape so as to face the two magnet holding portions 18d and 18e and supports two position detection sensors 38 and 40 that are respectively positioned behind the two permanent magnets 34 and 36. The position detection sensors 38 and 40 are magnetic sensors (Hall sensors). The position detection sensors 38 and 40 are connected to the aforementioned flexible PWB (not shown) which extends from the shutter unit 16, and are further connected to the control circuit 60 on the aforementioned control circuit board of the camera, in which the present embodiment of the anti-shake lens unit 10 is incorporated, via the other flexible PWB (not shown) provided inside the lens barrel. A displacement of the permanent magnet 34 causes the output of the position detection sensor 38 to vary, and a displacement of the permanent magnet 36 causes the output of the position detection sensor 40 to vary. The control circuit 60 can detect the drive position of the anti-shake frame 18, which is driven by the anti-shake drive actuator 26, from variations in output of the two position detection sensors 38 and 40.

The anti-shake lens unit 10 is provided with an insertable/removable frame 20 which is supported by the anti-shake frame 18 thereon to be rotatable (swingable) about a rotational shaft (rotational axis) 42 that is parallel to the photographing optical axis O. The front end of the rotational shaft 42 is fixedly fitted into a shaft support hole 18*f* formed in the anti-shake frame 18, and the rear end of the rotational shaft 42 is fixed to a retaining member 44 fixed to the anti-shake frame 18. The insertable/removable frame 20 is provided with a cylindrical lens holder portion 20*a*, a shaft bearing portion 20*b* and an arm portion 20*c*. The cylindrical lens holder portion 20*a* holds the insertable/removable image-stabilizing lens 12, the rotational shaft 42 is inserted into the shaft bearing portion 20*b*, and the cylindrical lens holder portion 20*a* and the shaft bearing portion 20*b* are connected via the arm portion 20*c*. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20*d* formed on the cylindrical lens holder portion 20*a* with a stopper (an element of an insertion holder) 18*g* formed on the anti-shake frame 18. The insertable/removable frame 20 is biased toward the insertion position by an insertable/removable frame biasing spring (an element of the insertion holder) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20*b* and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position, the center of the insertable/removable image-stabilizing lens 12 is displaced from the photographing optical axis O in the Y-axis direction. A clearance hole 18*h*, the shape of which corresponds to the path of movement of the cylindrical lens holder portion 20*a* that is defined by the arc-shaped path about the rotational shaft 42, is formed through the anti-shake frame 18, and the front end of the cylindrical lens holder portion 20*a* is positioned in the clearance hole 18*h* when the insertable/removable frame 20 is at the removed position. The clearance hole 18*h* is open at (extends through) a portion of the outer periphery of the anti-shake frame 18, and the anti-shake frame 18 is provided over this opening portion with a reinforcing bridge 18*i*. As can be seen in FIGS. 1 and 2, the reinforcing bridge 18*i* is offset rearwardly to be prevented from interfering with the cylindrical lens holder portion 20*a* when the insertable/removable frame 20 rotates to the removed position. The anti-shake frame 18 is operatively associated with the insertable/removable frame 20 so as to be movable in a direction toward the removed position of the insertable/removable frame 20, and the anti-shake frame 18 is prevented from moving beyond the movement limit thereof in this direction in the Y-axis direction, in which the end of the inner wall of each of the two movement limit holes 18*c* of the anti-shake frame 18 on the insertion position side (the lower end of the inner wall of each movement limit hole 18*c* with respect to FIGS. 6 through 12) is made to come into contact with the associated movement limit projection 16*d* (see FIG. 9). The aforementioned movement limit of the anti-shake frame 18 in the Y-axis direction is hereinafter referred to as the removal assisting position.

The removal drive lever 24 is positioned in the linear moving ring 14 and supported thereby to be rotatable (swingable) about a rotational shaft (rotational axis) 50 that is parallel to the photographing optical axis O. The rotational shaft 50 is formed integral with the linear moving ring 14 so as to be positioned in the vicinity of the rotational shaft 42 (see FIG. 1). The rotational shaft 50 is inserted into a shaft hole formed through a shaft bearing portion 24*a* of the removal drive lever 24. A retaining plate 52 is fixed to the rear of the linear moving ring 14 to prevent the removal drive lever 24 from moving rearward. The removal drive lever 24 is provided with an arm portion 24*b* which extends radially from the shaft bearing portion 24*a* and is further provided in the vicinity of the free end of the arm portion 24*b* with a removal pressing portion 24*c* that is capable of coming into contact with a pressing-force receiving part 20*e* formed on the arm portion 20*c* of the insertable/removable frame 20. The point of contact of the removal pressing portion 24*c* with the pressing-force receiving part 20*e* is shown as a point of application T in FIGS. 9 through 11. Although such a point of contact is herein referred to as "a point of application", mutually opposed areas of the pressing-force receiving part 20*e* and the removal pressing portion 24*c* have a certain length in the optical axis direction, so that the pressing-force receiving part 20*e* and the removal pressing portion 24*c* practically come in line contact with each other in a linear region elongated in a direction parallel to the photographing optical axis O.

Figure 6:
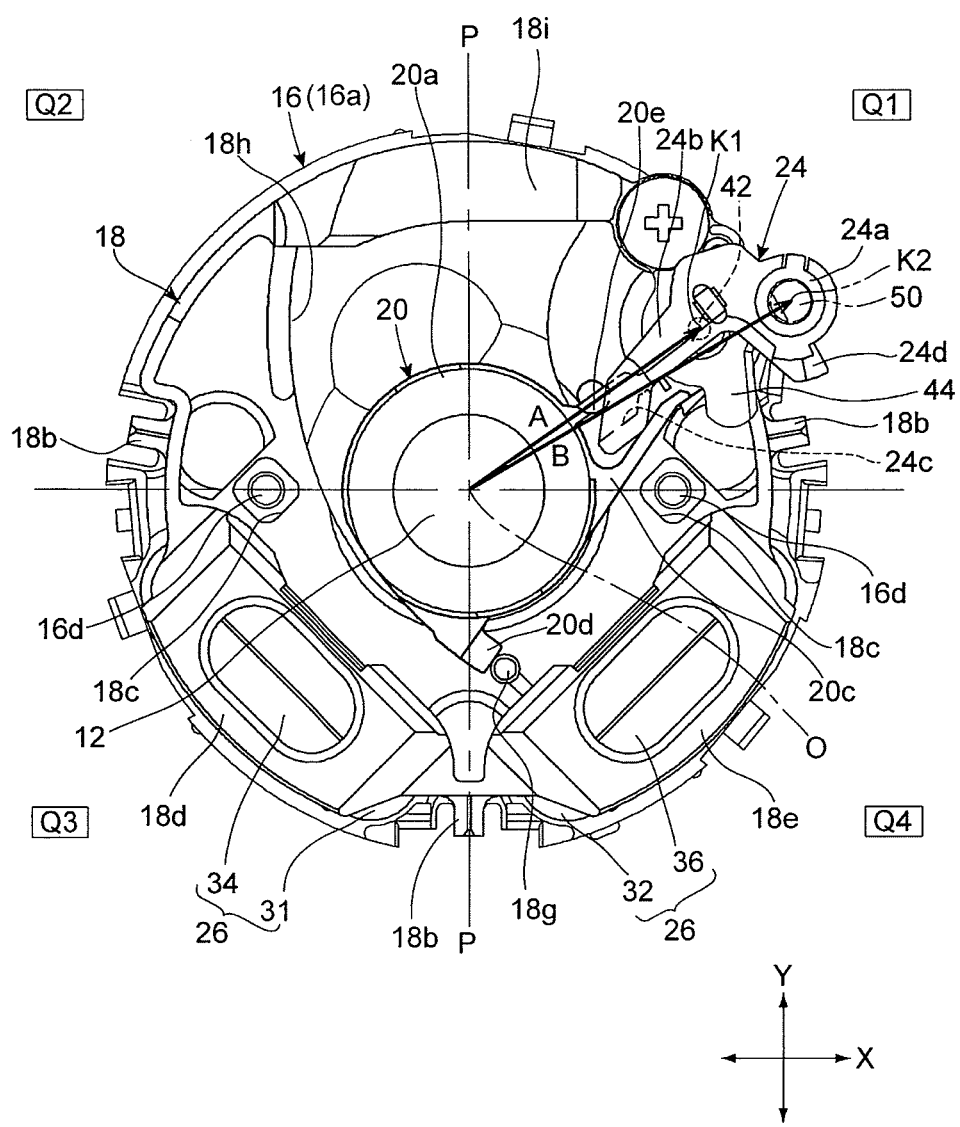
FIG. 6 is a rear elevational view of part of the anti-shake lens unit in the ready-to-photograph state of the lens barrel, viewed from the image plane side.
Figure 7:
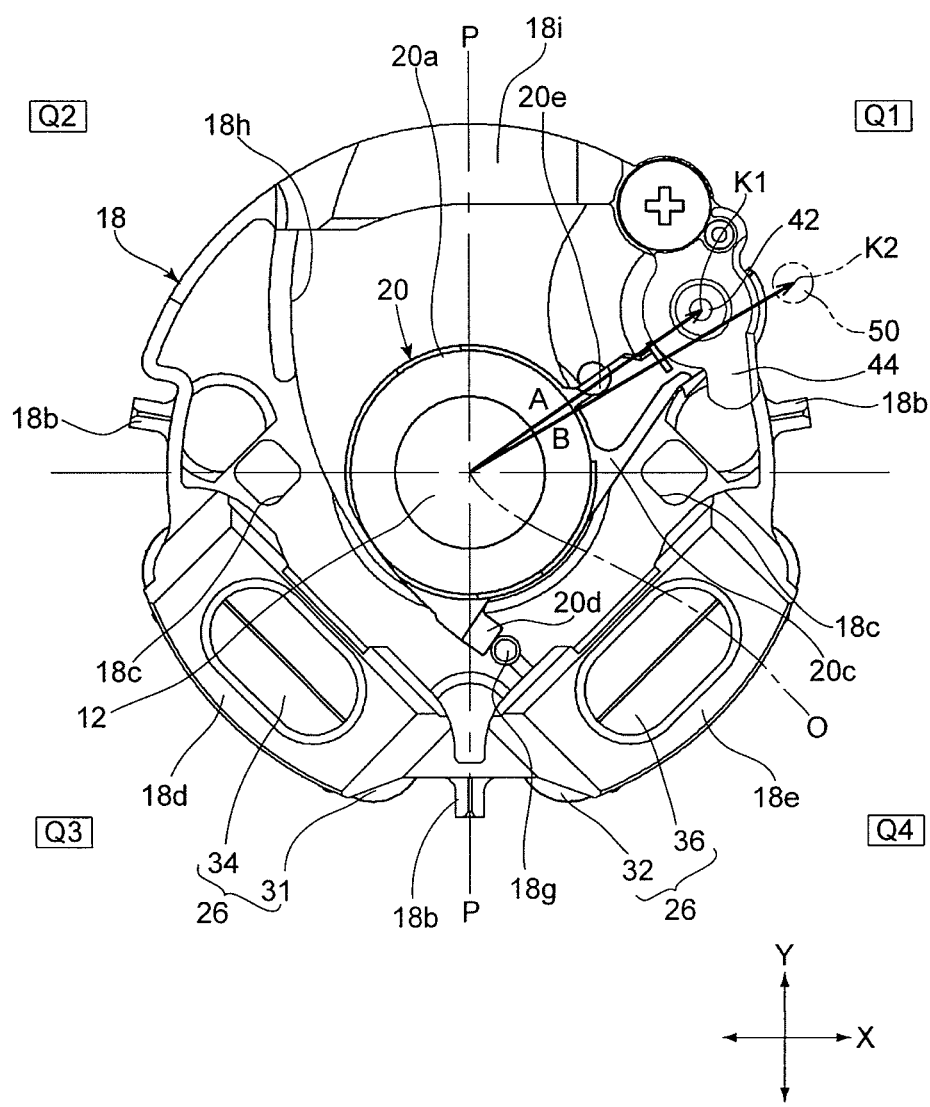
FIG. 7 is a rear elevational view that shows elements of the anti-shake lens unit shown in FIG. 6 which are driven during an image-stabilizing operation and coils shown in FIG. 6.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) by a removal drive lever biasing spring (an element of the insertion/removal controller/biasing member) 54. A stopper (not shown) which determines the rotation limit of the removal drive lever 24 in the biasing direction of the removal drive lever biasing spring 54 is formed on the inside of the linear moving ring 14. On the other hand, rotation of the insertable/removable frame 20 in the biasing direction of the insertable/removable frame biasing spring 46 is limited by engagement between the stopper contact portion 20*d* and the stopper 18*g*. FIG. 6 shows a state where the insertable/removable frame 20 and the removal drive lever 24 are in contact with the stopper 18*g* and the aforementioned stopper (not shown) of the linear moving ring 14, respectively, and at this stage the pressing-force receiving part 20*e* and the removal pressing portion 24*c* are not in contact with each other at the point of application T and are spaced from each other (see FIGS. 4 and 5). The clearance between the pressing-force receiving part 20*e* and the removal pressing portion 24c is determined to be such a degree as to prevent the pressing-force receiving part 20e from coming in contact with the removal pressing portion 24c in the moving range of the anti-shake frame 18 relative to the shutter unit 16 (i.e., the aforementioned range until the movement limit projections 16d come into contact with the inner walls of the two movement limit holes 18c, respectively). In other words, the anti-shake lens unit 10 is configured so that the removal drive lever 24 does not interfere with either of the anti-shake driving operations of the anti-shake frame 18 and the insertable/removable frame 20 that are performed by the anti-shake drive actuator 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24a with a pressing-force receiving part 24d. A insertion/removal control-projection (an element of the insertion/removal controller/pressing member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24d to rotate the removal drive lever 24 in a direction toward the removed position of the insertable/removable frame 20 from the insertion position of the insertable/removable frame 20. More specifically, the insertion/removal control-projection 58 is provided at the front end thereof with an end-face cam 58a, and retractive movement of the linear moving ring 14 toward the insertion/removal control-projection 58 causes the pressing-force receiving part 24d to come into contact with the end-face cam 58a. Subsequently, a further retractive movement of the linear moving ring 14 with the pressing-force receiving part 24d remaining in contact with the end-face cam 58a causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24c to come into contact with the pressing-force receiving part 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving part 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58b which is formed on a side of the insertion/removal control-projection 58 to extend substantially parallel to the optical axis O is engaged with a side of the pressing-force receiving part 24d, so that the insertable/removable frame 20 is held in the removed position (see FIG. 9).

Figure 15:
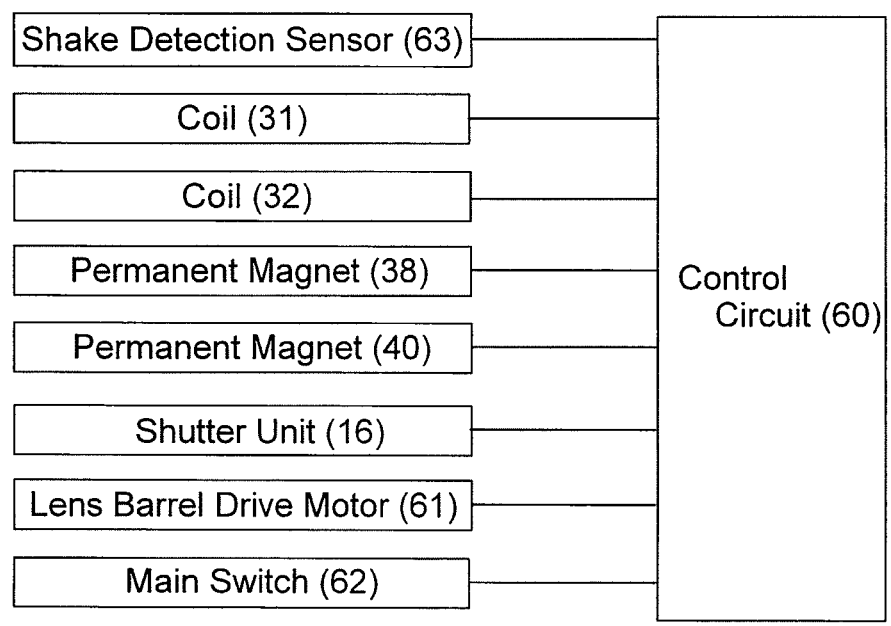
FIG. 15 is a block diagram showing electrical parts of the camera related to the anti-shake lens unit.

FIG. 15 conceptually shows electrical components of the camera in which the present embodiment of the anti-shake lens unit 10 is incorporated. The control circuit 60 that controls the overall operations of the camera is included in the camera. A shake detection sensor 63 includes gyro sensors which sense the angular velocity of the camera around each of X and Y axes (two orthogonal axes), and output signals of the shake detection sensor 63 are inputted to the control circuit 60. Upon receipt of the output signals from the shake detection sensor 63, the control circuit 60 calculates the driving amounts and the driving directions of the insertable/removable image-stabilizing lens 12 (the anti-shake frame 18) in order to cancel out the image shake. Subsequently, in accordance with the calculated values thus obtained, the control circuit 60 controls the electrical conduction of current through each of the coils 31 and 32, which constitute elements of the anti-shake drive actuator 26. In addition, the control circuit 60 detects variations in position of the permanent magnets 38 and 40 via the position detection sensors 38 and 40. The control circuit 60 drives the lens barrel drive motor to change the state of the lens barrel between a ready-to-photograph state and the lens barrel accommodated state in accordance with the ON/OFF state of the main switch 62.

Operations of the anti-shake lens unit 10 that has the above described structure will be discussed hereinafter. In a ready-to-photograph state shown in FIGS. 6 through 8, the insertable/removable frame 20 is held in the insertion position by the biasing force of the insertable/removable frame biasing spring 46, and the center (optical axis) of the insertable/removable image-stabilizing lens 12 is coincident with the photographing optical axis O. In this ready-to-photograph state, deviations (image shake) of an object image focused on an image plane can be reduced by driving the insertable/removable image-stabilizing lens 12 in directions orthogonal to the photographing optical axis O by the anti-shake drive actuator 26 in accordance with the direction and magnitude of vibrations applied to the photographing optical system. More specifically, the control circuit 60 detects the angular velocity of the camera about each of X and Y axes via the shake detection sensor 63, and time-integrates the detected angular velocity to determine a moving angle. Subsequently, from this moving angle, the control circuit 60 calculates the moving amounts of the image on the focal plane in the X-axis direction and in the Y-axis direction, and calculates the driving amounts and the driving directions of the insertable/removable image-stabilizing lens 12 (the anti-shake frame 18) for the respective axial directions in order to cancel out the image shake. Subsequently, in accordance with the calculated values, the control circuit 60 controls the passage of current through each of the coils 31 and 32. Thereupon, the anti-shake frame 18 is moved while being supported by the three guide balls 28 at the three ball contact surfaces 18a. Movements of the anti-shake frame 18 cause the permanent magnets 34 and 36 that are held by the anti-shake frame 18 to be displaced, and this displacement is feedback-controlled by being sensed by the position detection sensors 38 and 40 and. When the anti-shake frame 18 is made to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move.

In a ready-to-photograph state, it is possible to calibrate the position detection sensors 38 and 40 by utilizing information on the positions of movement limits of the anti-shake frame 18, where each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by the each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

Upon the main switch 62 being turned OFF, operations for brining the lens barrel from a ready-to-photograph state to the lens barrel accommodated state are carried out by control of the control circuit 60. More specifically, the anti-shake lens unit 10 (the linear moving ring 14) is moved rearward in the optical axis direction by the lens barrel drive motor 61, and the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side in the Y-axis direction comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the resultant of a combination of the movement of the anti-shake frame 18 to the removal assisting position in the Y-axis direction and the rotation of the insertable/removable frame 20 to the removed position.

Figure 9:
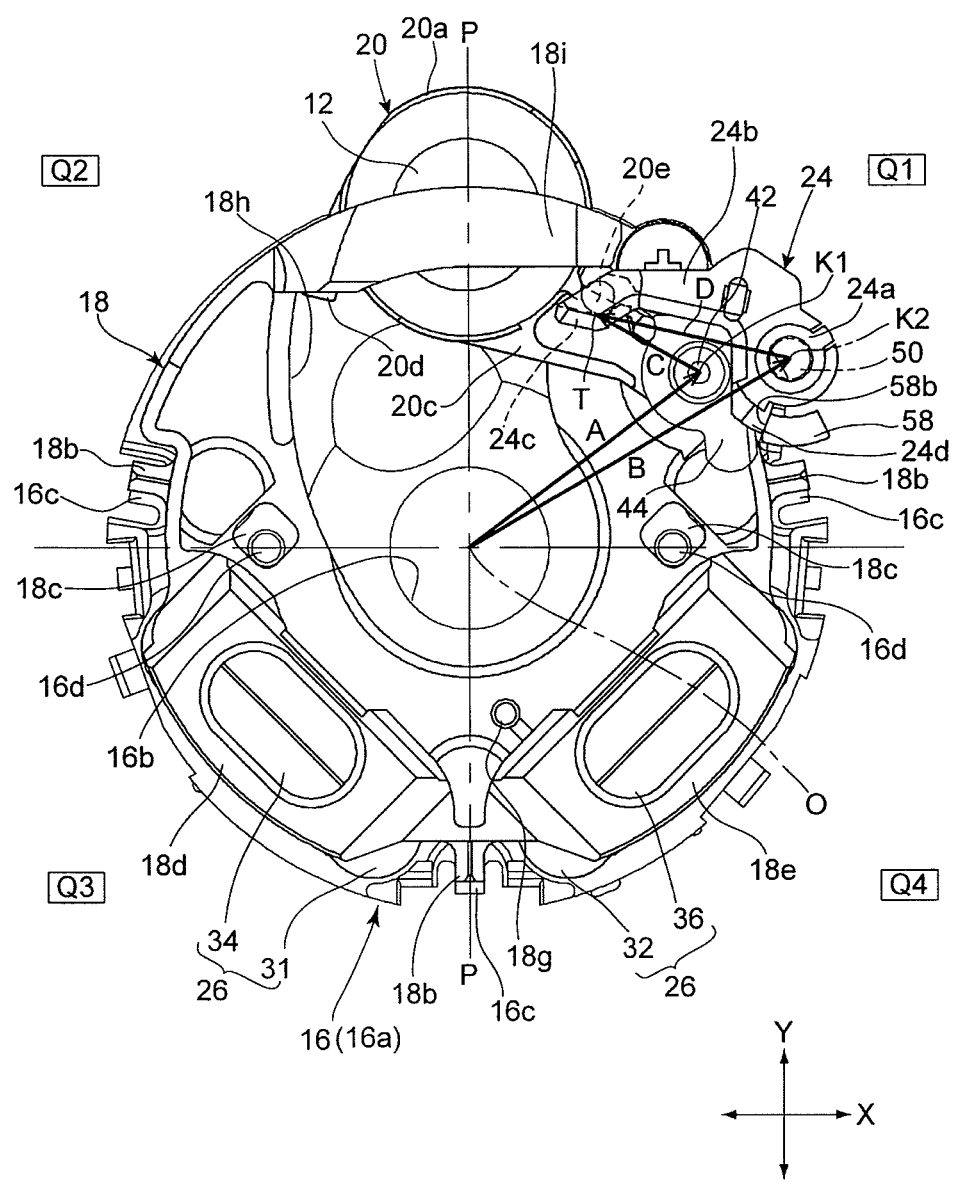
FIG. 9 is a rear elevational view of the portion of the anti-shake lens unit shown in FIG. 6 in a lens barrel accommodated state (fully-retracted state) of the lens barrel.
Figure 10:
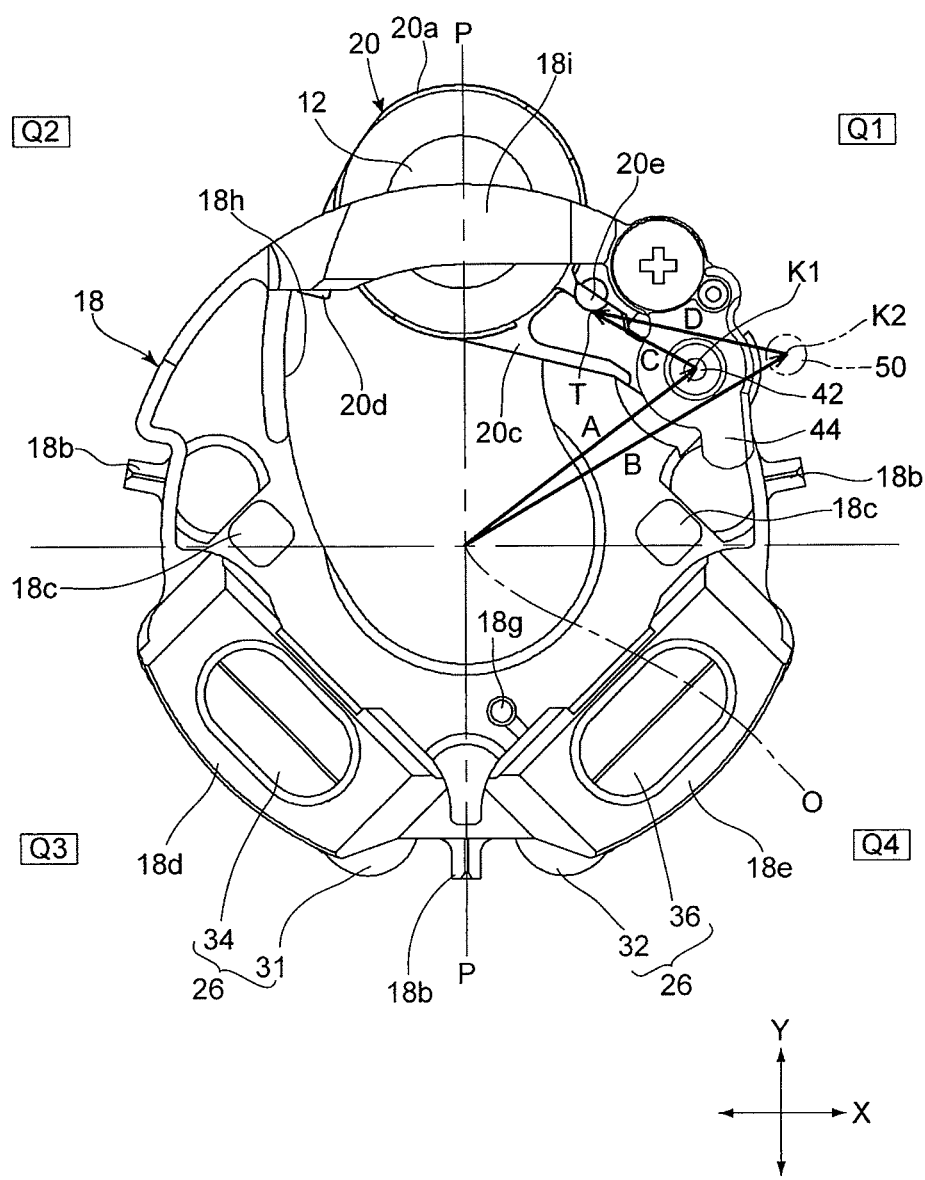
FIG. 10 is a rear elevational view of elements of the anti-shake lens unit shown in FIG. 9 which are driven during an image-stabilizing operation and the coils shown in FIG. 9.

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24 (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Upon the main switch 62 being turned ON when the lens barrel is in the lens barrel accommodated state, operations for moving the lens barrel from the lens barrel accommodated state to a ready-to-photograph state are carried out by control of the control circuit 60. When the lens barrel moves from the lens barrel accommodated state to a ready-to-photograph state, the lens barrel drive motor 61 is driven to rotate in a lens barrel advancing direction by the control circuit 60, the linear moving ring 14 is moved forward to thereby release the pressing force of the insertion/removal control-projection 58 against the removal drive lever 24, which causes the removal drive lever 24 to return to the position shown in FIG. 6 by the biasing force of the insertable/removable frame biasing spring 46. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the anti-shake lens unit 10, the removal drive lever 24 is supported by the linear moving ring 14 therein separately from the insertion/removal frame 20 that supports the insertable/removable image-stabilizing lens 12 and the anti-shake frame 18, and the removal drive lever 24 is moved to the forced removing position by pressing the removal drive lever 24 by the insertion/removal control-projection 58 to press and move the insertion/removal frame 20 to the removed position via the removal drive lever 24 when the lens barrel moves from a ready-to-photograph state to the lens barrel accommodated state. The removal drive lever 24 is supported by the linear moving ring 14 rather than the anti-shake frame 18. Additionally, the rotational shaft 50 that pivotally supports the removal drive lever 24 is parallel to the rotational shaft 42 that pivotally supports the insertion/removal frame 20 so that both the removal drive lever 24 and the insertion/removal frame 20 are rotated along a plane orthogonal to the photographing optical axis O. Accordingly, the region to which the load in the optical axis direction is applied only extends until the removal drive lever 24, and no load in the optical axis direction is imposed on the insertion/removal frame 20 or the anti-shake frame 18. Since the removal pressing portion 24c and the pressing-force receiving part 20e are formed as surfaces having shapes that do not transmit any force in a direction parallel to the photographing optical axis O as described above, the insertion/removal frame 20 is not pressed in a direction along the axis of the rotational shaft 42 even if the removal drive lever 24 which has been pressed by the insertion/removal control-projection 58 slightly moves in a direction along the axis of the rotational shaft 50. This lightens the load on the support mechanism for the insertion/removal frame 20 and the anti-shake frame 18 and ensures a high-precision driving of the insertable/removable image-stabilizing lens 12.

In addition, unlike the insertion/removal frame 20 that varies the position of the rotational shaft 42 in accordance with movement of the anti-shake frame 18, the removal drive lever 24 that is pressed by the insertion/removal control-projection 58 does not vary the position of the rotational shaft 50 in the linear moving ring 14, which makes it possible to maintain a constant positional relationship between the removal drive lever 24 and the insertion/removal control-projection 58 without being influenced by variations in position of the anti-shake frame 18 and the insertion/removal frame 20. Hence, the relative position between the pressing-force receiving part 24d of the removal drive lever 24 and the end-face cam 58a of the insertion/removal control-projection 58 does not vary, so that the removal drive lever 24 can be driven with high precision. Since the point of contact (the point of application T) between the removal drive lever 24 and the insertion/removal frame 20 is set on the removal pressing portion 24c, which is a flat surface extending in a radial direction of rotation of the removal drive lever 24, and the pressing-force receiving part 20e, which is an outer peripheral surface of a cylindrical projection, the removal pressing portion 24c can be brought into contact securely with the pressing-force receiving part 20e to make the insertion/removal frame 20 rotate to the removed position even if the position of the insertion/removal frame 20 varies by deviations of the anti-shake frame 18 which are performed to reduce image shake.

As shown in FIGS. 6 through 12, the rotational shaft 42 of the insertion/removal frame 20 and the rotational shaft 50 of the removal drive lever 24 are positioned in the same quadrant, i.e., the first quadrant Q1 among four quadrants Q1, Q2, Q3 and Q4 that are defined about the photographing optical axis O in a plane orthogonal to the photographing optical axis O, and the rotational shaft 50 is positioned farther from the photographing optical axis O than the rotational shaft 42 in a radially outward direction of the photographing optical axis O. Namely, the distance A from the photographing optical axis O to a center (rotational axis) K1 of the rotational shaft 42 (the rotational center of the insertion/removal frame 20) is smaller than the distance B from the photographing optical axis O to a center (rotational axis) K2 of the rotational shaft 50 (the rotational center of the removal drive lever 24) (i.e., the condition A<B is satisfied). In addition, as shown in FIGS. 9 through 11, when the insertion/removal frame 20 is pressed and rotated toward the removed position by the removal drive lever 24, the point of contact between the removal pressing portion 24c of the removal drive lever 24 and the pressing-force receiving part 20e of the insertion/removal frame 20 is shown as a point of application T; if C represents the distance (rotational radius) from the center K1 of the rotational shaft 42 to the point of application T and if D represents the distance (rotational radius) from the center K2 of the rotational shaft 50 to the point of application T, the distances C and D satisfy the condition C<D. Namely, the rotational center of the removal drive lever 24 is positioned farther from the photographing optical axis O than the rotational center of the insertion/removal frame 20 (i.e., A<B), and the rotational radius of the removal drive lever 24 to the point of application T is greater than the rotational radius of the insertion/removal frame 20 to the point of application T (i.e., C<D).

Although the position of the rotational shaft 42 of the insertion/removal frame 20 when the lens barrel is in the ready-to-photograph state varies in accordance with the drive position of the anti-shake frame 18 that is driven by the anti-shake drive actuator 26, the positions of the rotational shafts 42 and 50 are determined so as to maintain the aforementioned conditions A<B and C<D within the moving range of the anti-shake frame 18 (the insertion/removal frame 20) that is defined by engagement of the inner wall of each movement limit hole 18c with the associated movement limit projection 16d. For instance, FIGS. 6 through 8 each show a state where each movement limit projection 16d is positioned at the approximate center of the associated movement limit hole 18c, and FIGS. 9 through 11 each show a state where the anti-shake frame 18 has been moved to the removal assisting position to thereby make one end of the inner wall of each of the two movement limit holes 18c of the anti-shake frame 18 in the Y-axis direction come in contact with the associated movement limit projection 16d; however, the condition A<B is maintained in all of the states shown in FIGS. 6 through 11. In addition, within the moving range of the anti-shake frame 18 (the insertion/removal frame 20), the condition C<D is satisfied and maintained at all times even when the anti-shake frame 18 is not in the removal assisting position, i.e., not in the state shown in FIGS. 9 through 11. However, it should be noted that since the insertion/removal frame 20 and the removal drive lever 24 do not contact each other in the ready-to-photograph state, the condition C<D is satisfied when the lens barrel moving from the ready-to-photograph state to the accommodated state.

According to the above structure, by satisfying the arrangement of the center K1 of the rotational shaft 42 (the rotational center of the insertion/removal frame 20) and the center K2 of the rotational shaft 50 (the rotational center of the removal drive lever 24) with respect to the point of application T, to which a pressing force is applied from the removal drive lever 24 to the insertion/removal frame 20, namely, by satisfying the condition C<D for the rotational radius of the insertion/removal frame 20 and the rotational radius of the removal drive lever 24, the amount of rotation of the insertion/removal frame 20 can be increased toward the removed position per unit of rotation angle of the removal drive lever 24 to be greater than the case of the condition C=D (in which the insertion/removal frame 20 and the removal drive lever 24 rotate about approximately the same axis of rotation) or the condition C>D is satisfied. Accordingly, the insertion/removal frame 20 can be rotated to the removed position by a small amount of rotation of the removal drive lever 24. The amount of rotation of the removal drive lever 24 is determined in accordance with factors such as the amount of movement of the linear moving ring 14 in the optical axis direction when the lens barrel moves from a ready-to-photograph state to the lens barrel accommodated state and the shape (inclination angle) of the end-face cam 58a of the insertion/removal control-projection 58; if the amount of removal movement of the insertion/removal frame 20 per unit of rotation angle of the removal drive lever 24 is great, the insertion/removal frame 20 can be efficiently driven and moved to the removed position by a small amount of movement of the linear moving ring 14, which makes it possible to achieve a position controller for an removable optical element which is superior in drive efficiency.

Additionally, the satisfaction of the condition A<B for the arrangement of the center K1 of the rotational shaft 42 (the rotational center of the insertion/removal frame 20) and the center K2 of the rotational shaft 50 (the rotational center of the removal drive lever 24) with respect to photographing optical axis O makes it possible to set the removal drive lever 24 at a position radially farther from the photographing optical axis O than that in the case where the condition A=B or the condition A>B is satisfied. It is difficult to secure an installation space for structural elements closer to the photographing optical axis O than the insertion/removal frame 20 for the removal driving such as the removal drive lever 24 since elements such as the anti-shake frame 18 and the anti-shake drive actuator 26 are compactly arranged in the linear moving ring 14 in addition to the insertion/removal frame 20. In the present embodiment, with by satisfying the condition A<B, it is possible to provide the removal drive lever 24 at a position which does not easily interfere with the anti-shake frame 18 and the anti-shake drive actuator 26 while satisfying the aforementioned condition C<D. From the viewpoint of space utilization, it is desirable to not only satisfy the condition A<B but also install the rotational shaft 50 in the vicinity of the inner peripheral surface of the linear moving ring 14 (closer to the photographing optical axis O than inner peripheral surface of the linear moving ring 14) as shown in FIGS. 1 through 3. If it is assumed that the rotational shaft 50 is arranged to be positioned radially outside of the peripheral surface of the linear moving ring 14, the entire anti-shake lens unit 10 may undesirably increase in diameter, so that it is recommendable that the position of the rotational shaft 50 be provided within the inner peripheral surface of the linear moving ring 14 as an optimal arrangement which is superior in space utilization while preventing the anti-shake lens unit 10 from increasing in size.

Although the present invention has been discussed with reference to the above described embodiment, the present invention is not limited to this particular embodiment. For instance, since the member for translating the moving force of the advancing/retracting ring (the linear moving ring 14) in the optical axis direction into a force which presses the removable optical element holding member (the insertion/removal frame 20) toward the removed position is the removal drive member (the removal drive lever 24), the pivoted position of which (i.e., the rotational shaft 50) does not vary relative to the advancing/retracting ring, the removable optical element holding member (the insertion/removal frame 20) can be reliably removed to the removed position even if the position of the removable optical element holding member (the insertion/removal frame 20) slightly varies in a plane orthogonal to the optical axis (the photographing optical axis O). Accordingly, the present invention can be suitably applied to a lens system (lens barrel) equipped with a mechanism for adjusting the position of the removable optical element in a plane orthogonal to an optical axis for a purpose other than the inserting/removing operation of the removable optical element. In the above illustrated embodiment, the positional adjustment in a plane orthogonal to an optical axis is for driving for image shake correction, and the insertion/removal frame 20 is operatively associated with the anti-shake frame 18 to move in a plane orthogonal to an optical axis by the driving force of the anti-shake drive actuator 26. However, the present invention is not only effective in a structure achieving such movements for image shake correction; the present invention is also effective in a structure (disclosed in, e.g., Japanese Unexamined Patent Publication 2004-233922) provided with a mechanism for adjusting the position of the rotational shaft 42 of the insertion/removal frame 20. Although the relative position between the insertion/removal control-projection 58 and the insertion/removal frame 20 varies when an adjustment is made to the position of the rotational shaft 42 during assembly, the installation of the removal drive lever 24 between the insertion/removal control-projection 58 and the insertion/removal frame 20 makes it possible to obtain an effect similar to that obtained according to the above illustrated embodiment in terms of the capability of translating the moving force of the linear moving ring 14 in the optical axis direction into a rotational force and securely transmitting this rotational force to the insertion/removal frame 20 without being influenced by variations in position of the rotational axis of the insertion/removal frame 20.

Additionally, upon receiving a pressing force from the removal drive lever 24 when the lens barrel is accommodated, first the anti-shake frame 18 moves to the removal assisting position and subsequently the insertable/removable frame 20 alone rotates to the removed position; however, the sequence of such operations can be performed in a reverse order. For instance, the resistance to movement of the anti-shake frame 18 that is caused by the extension spring 30 can be set to be greater than the rotational resistance of the insertable/removable frame 20 that is caused by the insertable/removable frame biasing spring 46, while a stopper which determines the rotation limit of the insertable/removable frame 20 in the rotation direction thereof toward the removed position can be provided on the anti-shake frame 18. According to this configuration, upon receiving a pressing force from the removal drive lever 24 when the lens barrel is accommodated, first the insertable/removable frame 20 rotates to the removed position and thereupon is prevented from further rotating by the aforementioned stopper, and thereafter the anti-shake frame 18 together with the anti-shake frame 20 can move to the removal assisting position. Accordingly, although the point of application T (contact point between the pressing-force receiving part 20e and the removal pressing portion 24c) when the insertion/removal frame 20 is pressed and rotated to the removed position by the removal drive lever 24 slightly varies from the position shown in FIGS. 9 through 11, the above described effect can be obtained because the positions of the rotational shafts 42 and 50 are determined so as to maintain the aforementioned conditions A<B and C<D within the moving range of the anti-shake frame 18.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A position controller for a removable optical element provided in a photographing optical system which moves between a ready-to-photograph state and an accommodated state in which no pictures are taken, comprising:
    an advancing/retracting ring movable in an optical axis direction of said photographing optical system, wherein said advancing/retracting ring is moved between a first position at which said photographing optical system is in said ready-to-photograph state and a second position at which said photographing optical system is in said lens barrel accommodated state;
    a removable optical element holding member which holds said removable optical element and is supported by said advancing/retracting ring therein to be rotatable about a first rotational axis, which is parallel to said optical axis, between an insertion position at which said removable optical element is positioned on said optical axis and a removed position at which said removable optical element is removed from a position on said optical axis;
    an insertion holder which holds said removable optical element holding member at said insertion position when said photographing optical system is in said ready-to-photograph state;
    a removal drive member which is supported by said advancing/retracting ring to be rotatable about a second rotational axis that is substantially parallel to said optical axis between an insertion allowance position at which said removal drive member is in noncontact with said removable optical element holding member at said insertion position and a forced removing position at which said removal drive member comes in contact with and presses said removable optical element holding member to rotate said removable optical element holding member from said insertion position to said removed position; and
    an insertion/removal controller which holds said removal drive member in said insertion allowance position when said photographing optical system is in said ready-to-photograph state, and rotates said removal drive member from said insertion allowance position to said forced removing position when said advancing/retracting ring moves in said optical axis direction from said first position to said second position,
    wherein a first distance from said second rotational axis of said removal drive member to a contact point between said removable optical element holding member and said removal drive member is greater than a second distance from said first rotational axis of said removable optical element holding member to said contact point, and
    wherein said first rotational axis of said removable optical element holding member and said second rotational axis of said removal drive member are spaced apart from each other.

2. The position controller according to claim 1, wherein a third distance from said optical axis to said second rotational axis is greater than a fourth distance from said optical axis to said first rotational axis.

3. The position controller according to claim 1, wherein said insertion/removal controller comprises:
    a biasing member which biases said removal drive member to rotate toward said insertion allowance position; and
    a pressing member which is spaced away from said removal drive member in said optical axis direction when said photographing optical system is in said ready-to-photograph state, and said pressing member comes into contact with and presses said removal drive member to rotate said removal drive member toward said forced removing position against a biasing force of said biasing member when said advancing/retracting ring moves from said first position to said second position.

4. The position controller according to claim 1, further comprising a positional adjustment mechanism which enables a positional adjustment to be carried out on said removable optical element holding member along a plane orthogonal to said optical axis relative to said advancing/retracting ring independently of rotation of said removable optical element holding member between said insertion position and said removed position.

5. The position controller according to claim 4, wherein said positional adjustment mechanism comprises:
    an anti-shake moving member supported by said advancing/retracting ring to be movable along a plane orthogonal to said optical axis; and
    an anti-shake driver which drives said anti-shake moving member in accordance with vibrations applied to said photographing optical system to reduce image shake of an image focused on an image plane,
    wherein said removable optical element holding member is pivotally supported on said anti-shake moving member.

6. The position controller according to claim 4, wherein a clearance is formed between said removable optical element holding member and said removal drive member to prevent interference between said removable optical element holding member and said removal drive member which may be caused by a variation in position of the removable optical element holding member when said photographing optical system is in said ready-to-photograph state, said variation being caused by said positional adjustment mechanism.

7. The position controller according to claim 3, wherein said biasing member comprises a torsion coil spring, a coiled portion of which is positioned around said second rotational axis.

8. The position controller according to claim 5, wherein said insertion holder comprises a spring and a stopper formed on said anti-shake moving member.

9. The position controller according to claim 5, wherein said anti-shake drive mechanism comprises an electromagnetic actuator.

* * * * *